US009200855B2

(12) United States Patent
Kington et al.

(10) Patent No.: US 9,200,855 B2
(45) Date of Patent: Dec. 1, 2015

(54) TUBULAR HEAT EXCHANGE SYSTEMS

(75) Inventors: Harry Lester Kington, Scottsdale, AZ (US); Mark C. Morris, Phoenix, AZ (US); Donald G. Godfrey, Phoenix, AZ (US); John Meier, Phoenix, AZ (US); Charles Lo, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 894 days.

(21) Appl. No.: 13/412,761

(22) Filed: Mar. 6, 2012

(65) Prior Publication Data
US 2013/0236299 A1    Sep. 12, 2013

(51) Int. Cl.
| | |
|---|---|
| *F28F 9/02* | (2006.01) |
| *F28F 13/12* | (2006.01) |
| *F02C 7/08* | (2006.01) |
| *F28F 9/26* | (2006.01) |
| *F28D 7/16* | (2006.01) |

(Continued)

(52) U.S. Cl.
CPC ............... *F28F 9/0263* (2013.01); *F02C 7/08* (2013.01); *F02C 7/10* (2013.01); *F28D 7/1669* (2013.01); *F28D 21/001* (2013.01); *F28F 9/0282* (2013.01); *F28F 9/26* (2013.01); *F28F 13/125* (2013.01); *F05D 2260/213* (2013.01); *Y02T 50/675* (2013.01)

(58) Field of Classification Search
CPC ..... F28F 9/0246; F28F 9/0263; F28F 9/0282; F28F 9/24; F28F 9/26; F28F 13/125; F28D 7/1669; F05D 2260/213
USPC ............... 415/177, 178, 144, 145; 165/109.1, 165/173, 175, 178
See application file for complete search history.

(56) References Cited

U.S. PATENT DOCUMENTS

| | | | |
|---|---|---|---|
| 1,882,085 A | 10/1932 | Nelson | |
| 2,241,209 A | 5/1941 | Lea | |
| 2,911,200 A * | 11/1959 | Gardner et al. | ............... 285/93 |

(Continued)

FOREIGN PATENT DOCUMENTS

| | | | |
|---|---|---|---|
| CH | 476273 A | 7/1969 | |
| CH | 535415 A | 3/1973 | |

(Continued)

OTHER PUBLICATIONS

Sabharwall, P. et al.; Diffusion-Welded Microchannel Heat Exchanger for Industrial Processes; Journal of Thermal Science and Enginering Applications, Mar. 2013, vol. 5; Copyright 2013 by Siemens AG.

(Continued)

*Primary Examiner* — Igor Kershteyn
*Assistant Examiner* — Jesse Prager
(74) *Attorney, Agent, or Firm* — Ingrassia Fisher & Lorenz, PC (57) ABSTRACT

A heat exchange system includes a first flow passage and a second flow passage. The heat exchange system is configured to transfer heat between a first fluid flowing through the first flow passage and a second fluid flowing through the second flow passage. The first flow passage includes an inlet header, a plurality of tubes, and an outlet header. The inlet header includes a plurality of header-tube transition portions configured to allow the first fluid to flow from the inlet header and into the tubes, the plurality of header-tube transition portions each including a smoothly curved inlet portion and a tapered tube connection portion.

20 Claims, 11 Drawing Sheets

(51) Int. Cl.
*F28D 21/00* (2006.01)
*F02C 7/10* (2006.01)

(56) References Cited

U.S. PATENT DOCUMENTS

| | | | |
|---|---|---|---|
| 3,185,210 A | | 5/1965 | Kuhne et al. |
| 3,409,075 A | | 11/1968 | Long |
| 3,527,291 A | | 9/1970 | Neary et al. |
| 3,549,176 A | | 12/1970 | Contreras |
| 4,120,352 A | * | 10/1978 | Husson ............ 165/173 |
| 4,350,372 A | | 9/1982 | Logsdon |
| 4,691,761 A | * | 9/1987 | Kito et al. ............ 165/300 |
| 4,832,114 A | * | 5/1989 | Yeh ............ 165/85 |
| 4,858,686 A | * | 8/1989 | Calleson ............ 165/173 |
| 5,145,215 A | | 9/1992 | Udell |
| 5,305,616 A | | 4/1994 | Coffinberry |
| 5,407,237 A | | 4/1995 | Smolowitz |
| 5,918,667 A | * | 7/1999 | Chiba et al. ............ 165/178 |
| 6,032,463 A | | 3/2000 | Bock |
| 7,398,798 B2 | | 7/2008 | Ostan et al. |
| 7,754,137 B2 | | 7/2010 | Sutcliffe et al. |
| 7,810,552 B2 | | 10/2010 | Slaughter |
| 7,866,372 B2 | | 1/2011 | Slaughter |
| 7,871,578 B2 | | 1/2011 | Schmidt |
| 8,306,665 B2 | | 11/2012 | Tsangaris et al. |
| 8,511,111 B2 | | 8/2013 | Lambert et al. |
| 2007/0251671 A1 | | 11/2007 | Barnes et al. |
| 2009/0065185 A1 | * | 3/2009 | Jekerle ............ 165/175 |
| 2009/0183857 A1 | | 7/2009 | Pierce et al. |
| 2009/0211743 A1 | * | 8/2009 | Schrader et al. ............ 165/173 |
| 2010/0018673 A1 | | 1/2010 | Yang |
| 2011/0056653 A1 | | 3/2011 | Zacharias |
| 2011/0088405 A1 | * | 4/2011 | Turco ............ 60/782 |
| 2011/0115227 A1 | | 5/2011 | Shafer et al. |
| 2011/0272122 A1 | | 11/2011 | Corbeil et al. |
| 2012/0232857 A1 | | 9/2012 | Fisker et al. |
| 2012/0292000 A1 | * | 11/2012 | Khan et al. ............ 165/109.1 |

FOREIGN PATENT DOCUMENTS

| | | | |
|---|---|---|---|
| CH | 535415 A | * | 8/1974 |
| DE | 102006003317 A1 | | 8/2007 |
| DE | 102010038132 A1 | | 4/2011 |
| EP | 0564135 A2 | | 10/1993 |
| EP | 1978323 A3 | | 10/2008 |
| EP | 2620618 A2 | | 7/2013 |
| EP | 2642083 A2 | | 9/2013 |
| FR | 2311269 A | | 12/1976 |
| JP | 2002130060 A | | 5/2002 |
| WO | 2006085792 A1 | | 8/2006 |
| WO | 2012028747 A1 | | 3/2012 |

OTHER PUBLICATIONS

Huan Z, DJ De Beer, et al.; Application of Laser Sintering Technology in Heat Exchanger Design and Manufacture; 2010 2nd International Conference on Computer Engineering and Technology, vol. 5; Copyright 2010 IEEE.

Antoine D.: "3D Printer Spider-Bots" Nov. 18, 2011, retrieved from the internet on Mar. 14, 2013, URL: http://www.growit3d.com/growit-blog/3d-printed-spider-bots/.

ProtoCAM's "Selective Laser Sintering (SLS), SLS Prototype" retrieved from the internet on Mar. 14, 2013, URL: http://www.protocam.com/html/sls.html.

Within's "Micro Cooler—Demonstrating an Effective Micro Cooling Control" retrieved from the Internet on Jun. 3, 2013, URL: http://withinlab.com/case-studies/index19.php.

EP Extended Search Report for Application No. EP 14186714.3 dated Nov. 21, 2014.

EP Extended Search Report for Application No. EP 14176161.9 dated Oct. 31, 2014.

Huan, Z et al; IEEE Explore—Application of Laser Sintering Technology in Heat Exchanger design and Manufacture; Issue date Apr. 16-18, 2010.

Wong, M et al; Convective Heat Transfer and Pressure Losses Across Novel Heat Sinks Fabricated by Selective Laser Melting; International Journal of Heat and Mass Transfer; vol. 52, Issues 1-2, Jan. 15, 2009, pp. 281-288.

CRDM LTD; Direct Metal Laser Sintering; 2011; Retrieved from internet [http://www.crdm.co.uk/direct-metal-laser-sintering-services.html].

Shelley T.; Rapid Prototyping Shows Its Metal; EUREKA The Site for Engineering Design; Sep. 2010; Retrieved from internet [http://www.eurekamagazine.co.uk/article/27538/Rapid-prototyping-shows-its-metal.aspx].

Liew, LS et al; The Application of the Brazing Process in Selective Laser Sintering Fabricated Parts; JSME International Journal Series A; vol. 46 (2003), No. 3 Special Issue on Recent Advances in Materials and Processing, pp. 506-511.

Terutake, H et al; The application of blazing process in SLS process fabricated heat exchanger; Science Links Japan; vol. 11th; 2003.

EP Search Report, EP 13157087.1-1605/2636982 dated Mar. 31, 2015.

USPTO Restriction Requirement, Notification Date May 21, 2015; U.S. Appl. No. 13/911,904.

USPTO Office Action for U.S. Appl. No. 13/911,904; Notification Date Aug. 3, 2015.

EP Examination Report for Application No. EP13157087.1 dated May 26, 2015.

* cited by examiner

TUBULAR HEAT EXCHANGE SYSTEMS

TECHNICAL FIELD

The present disclosure generally relates to heat exchange systems, and more particularly, in one implementation, relates to heat exchange systems for use in gas turbine engines.

BACKGROUND

In the field of gas turbine technology, a great deal of effort has been directed toward improving thermodynamic efficiency by operating gas turbine engines at increasing temperatures. As such, numerous heat exchange systems have been developed for directing heat within an engine to components where such heat is beneficial to the operating performance of the engine, while other heat exchange systems have been developed for directing heat away from engine components that normally cannot tolerate such high temperatures.

In one example, a class of heat exchange systems known as recuperators have been developed to recover heat from the engine exhaust, which is otherwise wasted energy, and redirect the recovered engine exhaust heat to the combustion portion of the engine, to increase its overall efficiency. Specifically, the recuperator is a heat exchanger that transfers some of the waste heat in the exhaust to the compressed air that enters the combustion portion of the engine, thus preheating it before entering the fuel combustor stage. Since the compressed air has been pre-heated, less fuel is needed to heat the compressed air/fuel mixture up to the desired turbine inlet temperature. By recovering some of the energy usually lost as waste heat, the recuperator can make a gas turbine significantly more efficient.

In another example, cooling air may be provided to various turbine engine components using cooling air extracted from other parts of the engine. For example, in some gas turbine engines, cooling air is extracted from the discharge of the compressor, and is then directed to certain portions of the turbine. During some operating conditions, the air that is extracted from the engine for cooling may be at temperatures that require the air to be cooled before being directed to the particular component requiring cooling. To achieve the required cooling, cooling air may be directed through one or more heat exchangers within the engine.

Recuperators, cooling air heat exchangers, and other heat exchange systems employed in gas turbine engines have been conventionally designed using either plate-fin architectures or tubular architectures. Plate-fin architectures, while relatively inexpensive to manufacture, do not result in favorable weight and performance characteristics. Tubular architectures, while relatively more efficient than plate-fin architectures, are often prohibitively expensive to manufacture. Furthermore, existing plate-fin and tubular architectures are susceptible to thermo-mechanical fatigue, which reduces their service life and/or necessitates costly repairs.

Hence, there is a need for heat exchange systems for use in gas turbine engines and other applications having improved efficiency, reduced manufacturing costs, and increased operating lifespan. The present disclosure addresses at least these needs.

BRIEF SUMMARY

Disclosed are tubular heat exchange systems. In one embodiment, an exemplary heat exchange system includes a first flow passage and a second flow passage. The heat exchange system is configured to transfer heat between a first fluid flowing through the first flow passage and a second fluid flowing through the second flow passage. The first flow passage includes an inlet header, a plurality of tubes, and an outlet header. The inlet header includes a plurality of header-tube transition portions configured to allow the first fluid to flow from the inlet header and into the tubes, the plurality of header-tube transition portions each including a smoothly curved inlet portion and a tapered tube connection portion.

In another embodiment, an exemplary heat exchange system includes a heat exchanger that is disposed within an inner fan duct of a gas turbine engine. The heat exchanger includes a heat exchanger first flow passage and a heat exchanger second flow passage. The heat exchanger first flow passage is coupled to receive engine air from within an engine case of the gas turbine engine, and the heat exchanger second flow passage is coupled to receive fan air from a bypass flow passage of the gas turbine engine. The heat exchanger is configured to transfer heat between the engine air and the fan air. The heat exchanger first flow passage includes an inlet header, a plurality of tubes, and an outlet header. Furthermore, the inlet header includes a plurality of header-tube transition portions configured to allow the first fluid to flow from the inlet header and into the tubes, the plurality of header-tube transition portions each including a smoothly curved inlet portion and a tapered tube connection portion.

In yet another embodiment, an exemplary heat exchange system includes a plurality of heat exchangers that are disposed within a turbofan engine. Each heat exchanger includes a heat exchanger first flow passage and a heat exchanger second flow passage. Each heat exchanger first flow passage is coupled to receive engine air from within an engine case of the turbofan engine, and each heat exchanger second flow passage is coupled to receive fan air from a bypass flow passage of the turbofan engine. Further, each heat exchanger is configured to transfer heat between the engine air and the fan air. The heat exchanger first flow passage includes an inlet header, a plurality of tubes, and an outlet header. Furthermore, the inlet header includes a plurality of header-tube transition portions configured to allow the first fluid to flow from the inlet header and into the tubes, the plurality of header-tube transition portions each including a smoothly curved inlet portion and a tapered tube connection portion.

Furthermore, other desirable features and characteristics of the heat exchange systems will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Furthermore, as used herein, numerical ordinals such as "first," "second," "third," etc., such as first, second, and third heat exchangers, simply denote different singles of a plurality unless specifically defined by language in the appended claims. All of the embodiments and implementations of the heat exchange systems described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

The heat exchange systems described herein are suitable for use in gas turbine engines, and other applications. Particularly, the heat exchange systems described herein may be implemented in a gas turbine engine to improve heat exchange performance, reduce manufacturing costs, and improve operational lifespan. In one implementation, the heat exchange system is embodied as a recuperator for heating compressed air prior to the entry thereof into the combustor. In another implementation, the heat exchange system is embodied as a cooling air heat exchanger for reducing the temperature of cooling air prior to its delivery to turbine components that require cooling. However, it will be appreciated that the presently disclosed heat exchange systems are not limited to use in the aforementioned embodiments. Rather, it is expected that the heat exchange systems disclosed herein will be suitable for use in a wide array of applications. Some non-limiting examples include engine oil cooling, auxiliary power units, environmental control systems, chemical reaction systems, and any other systems where heat exchange between two fluid media is either required or desirable.

Figure 1:
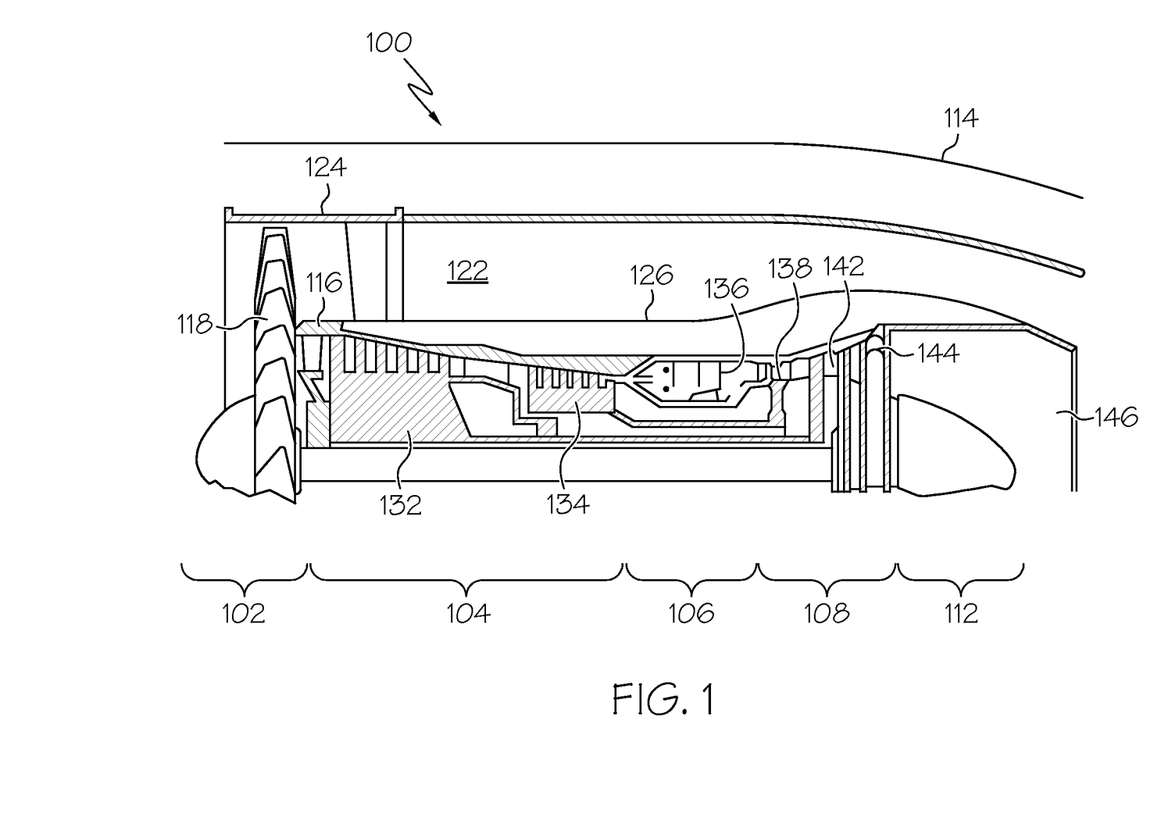
FIG. 1 depicts a simplified cross section view of a portion of an exemplary gas turbine engine.

In one embodiment, with general reference to FIGS. 1 through 5, the heat exchange system may be implemented as a cooling air heat exchanger. Referring now particularly to FIG. 1, a simplified cross section view of an exemplary gas turbine engine 100 is depicted. The depicted engine 100 includes an intake section 102, a compressor section 104, a combustion section 106, a turbine section 108, and an exhaust section 112. The intake section 102, compressor section 104, combustion section 106, turbine section 108, and exhaust section 112 are all mounted within a nacelle 114. The compressor section 104, combustion section 106, and turbine section 108 are all mounted within an engine case 116.

The intake section 102 includes a fan 118, which draws air into the engine 100 and accelerates it. A fraction of the accelerated fan air that is exhausted from the fan 118 is directed through a fan air bypass duct 122 that is defined by an outer fan duct 124 that is spaced apart from and surrounds an inner fan duct 126. Most of the fan air that flows through the fan air bypass duct 122 is discharged from the bypass duct 122 to generate a forward thrust. The fraction of fan air that does not flow into the fan air bypass duct 122 is directed into the compressor section 104.

The compressor section 104 can include one or more compressors. The engine 100 depicted in FIG. 1 includes two compressors: an intermediate pressure compressor 132 and a high pressure compressor 134. No matter the number of compressors it includes, the air that is directed into the compressor section 104 is pressurized to a relatively high pressure. The relatively high pressure air that is discharged from the compressor section 104 is directed into the combustion section 106. The combustion section 106 includes a combustor 136 that is coupled to receive both the relatively high pressure air and atomized fuel. The relatively high pressure air and atomized fuel are mixed within the combustor 136 and the mixture is ignited to generate combusted air. The combusted air is then directed into the turbine section 108.

The depicted turbine section 108 includes three turbines: a high pressure turbine 138, an intermediate pressure turbine 142, and a low pressure turbine 144, though it should be appreciated that any number of turbines may be included. The combusted air directed into the turbine section 108 expands through each of turbines 138, 142, 144, causing each to rotate. The air is then exhausted through a propulsion nozzle 146 disposed in the exhaust section 112 to provide additional forward thrust. As the turbines 138, 142, 144 rotate, each drives equipment in the gas turbine engine 100 via concentrically disposed shafts or spools as best seen in FIG. 1.

During operation, the temperatures within various portions of the engine 100 may reach relatively high temperatures. Thus, as depicted more clearly in FIG. 2, the engine 100 additionally includes a cooling air system 200 to provide cooling air to these various portions within the engine 100. The cooling air system 200 extracts relatively hot air 202 from within the engine case 116, directs the relatively hot air 202 through a cooling air heat exchanger 204 to be cooled, and then directs the cooled air 206 back into the engine case 116 to provide cooling air to various portions of the engine 100. In the embodiment depicted in FIG. 2, a portion of the fan air 203 in the fan air bypass duct 122 is supplied, via an inlet 214, to the heat exchanger 204. The supplied fan air 203 flows through the heat exchanger 204 to cool the relatively hot air 202 that is extracted from the engine case 116, and is then directed back into the fan air bypass duct 122. In a preferred implementation, fan air may be selectively (as opposed to continuously) supplied to the heat exchanger to improve operating performance of the engine, as described in greater detail in commonly-assigned U.S. patent application Ser. No. 13/358,161, titled "GAS TURBINE ENGINE IN-BOARD COOLED COOLING AIR SYSTEM," filed Jan. 25, 2012, the contents of which are herein incorporated by reference in their entirety.

Figure 2:
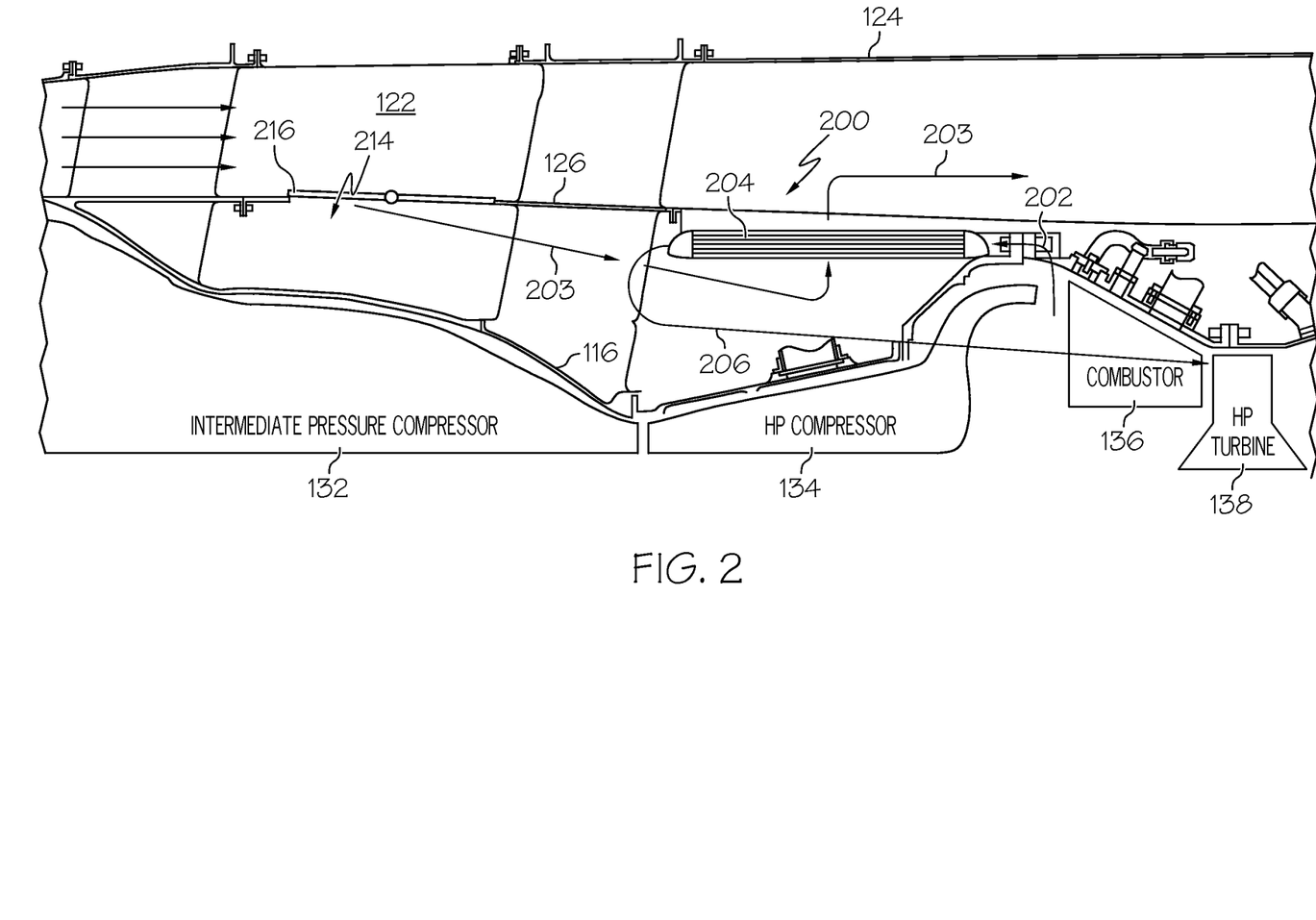
FIG. 2 depicts a close-up cross section view of a portion of the gas turbine engine of FIG. 1, illustrating an embodiment of a cooling air system.
Figure 3:
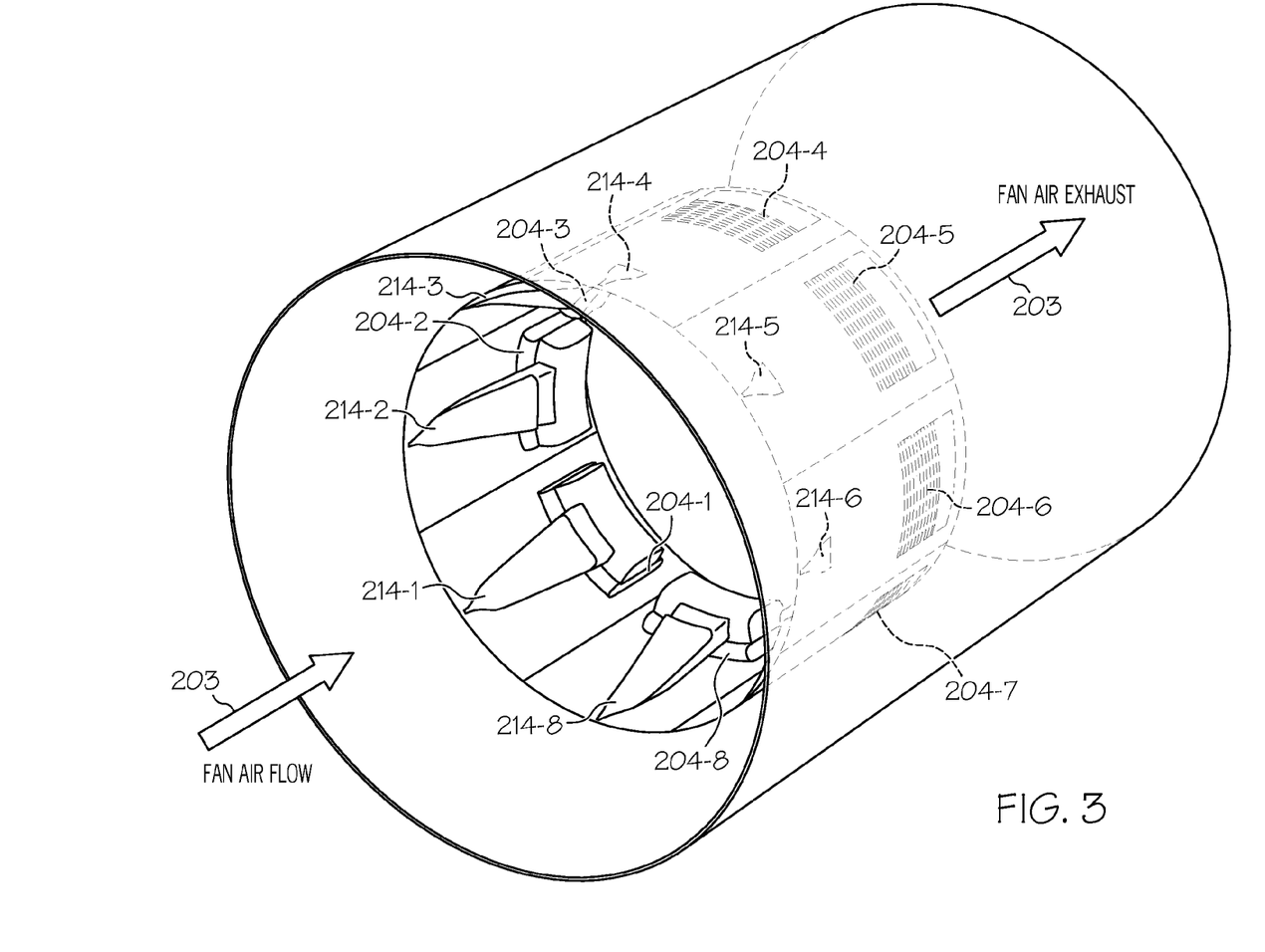
FIG. 3 depicts a simplified isometric view of inner and outer engine fan ducts, illustrating an arrangement of portions of the cooling air system depicted in FIG. 2.

For clarity and ease of illustration, only a single heat exchanger 204 and inlet 214 are depicted in simplified form in FIG. 2. However, as depicted more clearly in FIG. 3, the gas turbine engine 100 preferably includes a plurality of heat exchangers 204 (204-1, 204-2, 204-3, . . . , 204-8) and a plurality of inlets 214 (214-1, 214-2, 214-3, . . . , 214-8) (not all of which are visible in FIG. 3). Each of the inlets 214 are associated with a different one of the heat exchangers 204. Although the depicted embodiment is implemented with eight heat exchangers 204 and eight inlets 214, it will be appreciated that this is merely exemplary of one embodiment, and that other numbers of heat exchangers 204 and inlets 214 may be used.

Figure 4:
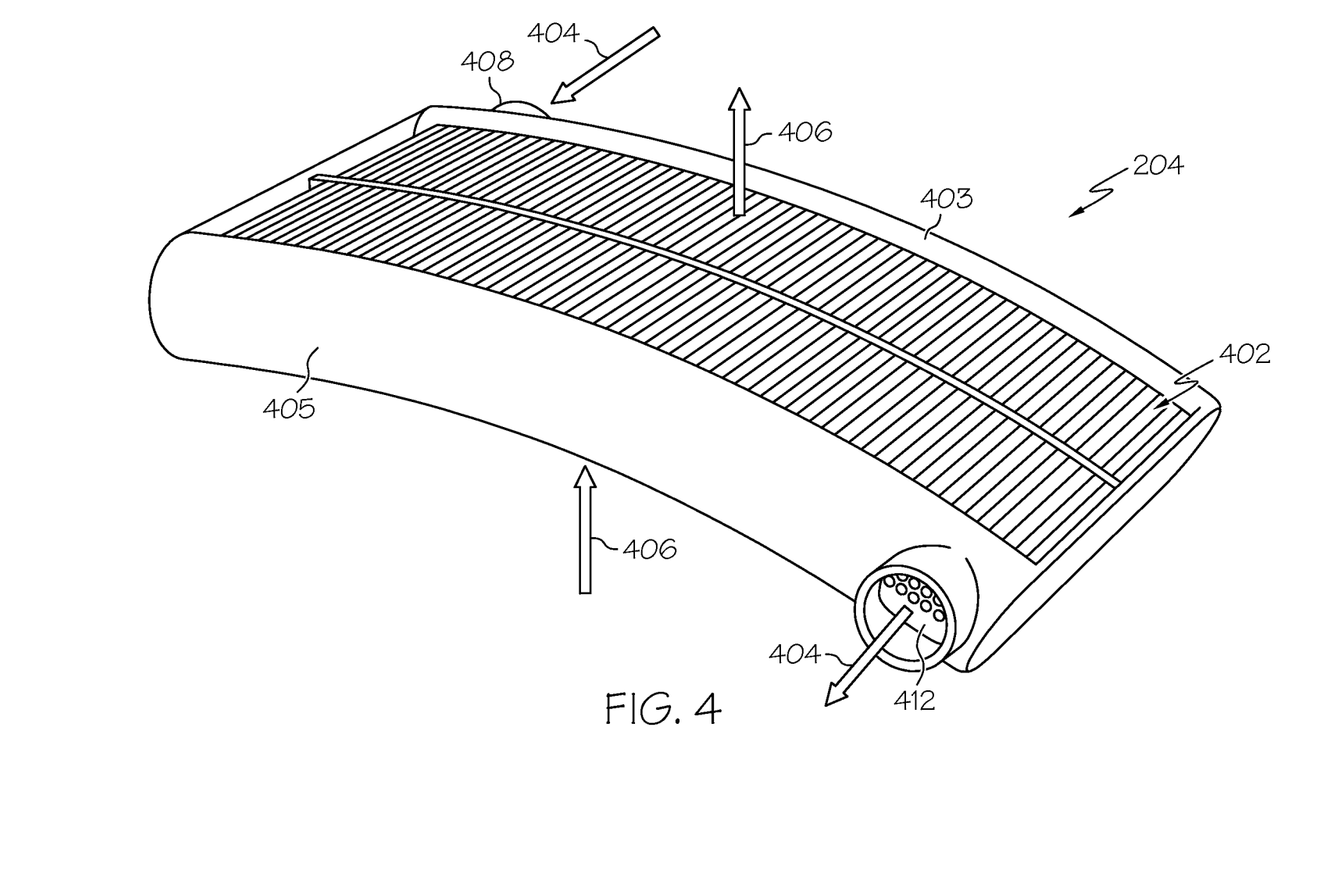
FIG. 4 depicts an embodiment of a heat exchange system that may be used to implement the cooling air system depicted in FIGS. 2 and 3.
Figure 5:
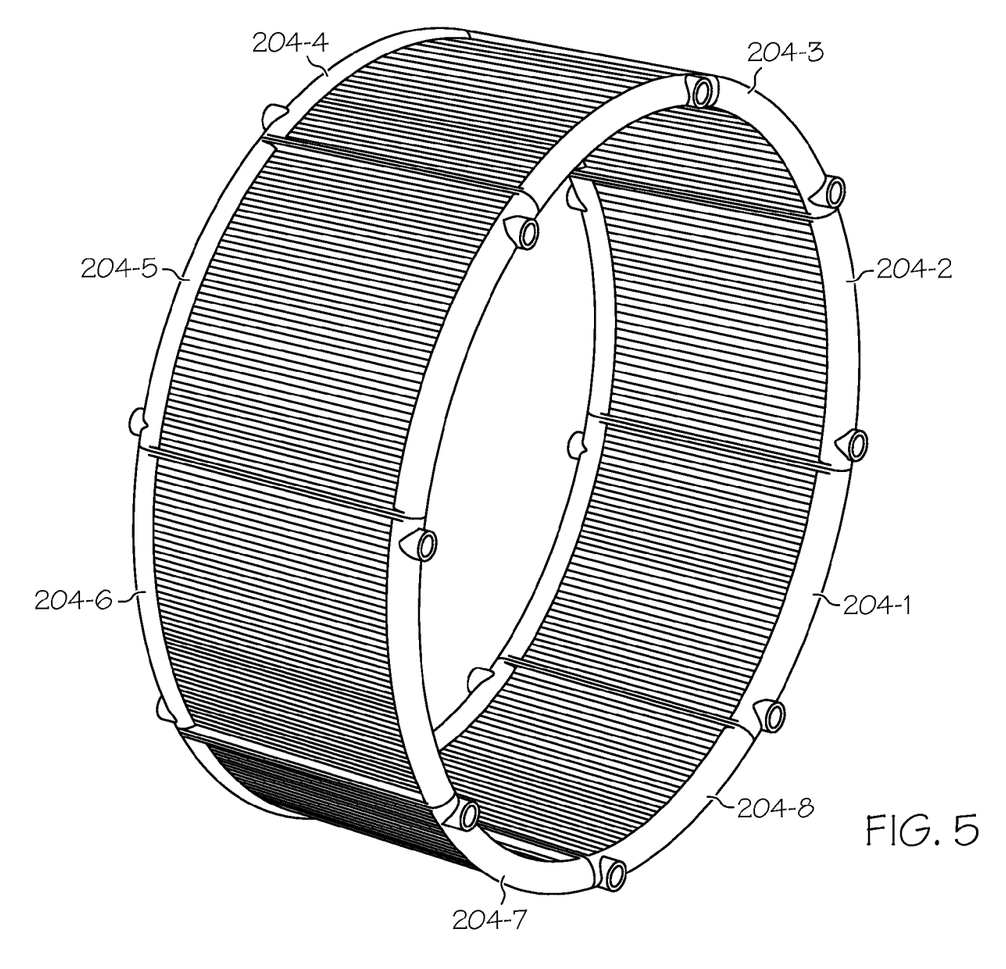
FIG. 5 depicts the heat exchange system of FIG. 4 coupled to other heat exchange systems to form an annular ring.

Each heat exchanger 204, an embodiment of one of which is depicted more clearly in FIG. 4, is preferably implemented as a conformal heat exchanger. The heat exchangers 204 are conformal, in that each is disposed within and conforms to the curvature of the inner fan duct 126 and, as shown most clearly in FIG. 5, the heat exchangers 204 are preferably coupled together to form an annular ring. This configuration minimizes the installation space, minimizes transmission pressure loss, and maximizes the differential pressure across the heat exchanger 204. While FIGS. 4 and 5 show a conformal heat exchanger with regard to a cooling air heat exchanger in a gas turbine engine, other shapes, sizes, and numbers of heat exchangers are possible to conform to other implementations.

The heat exchangers 204 are each configured to transfer heat between the relatively hot air 202 and the fan air. In the depicted embodiment, and with reference once again to FIG. 4, each heat exchanger 204 is implemented as a tubular bundle type that includes a plurality of tubes 402, a heat exchanger first flow passage 404, and a heat exchanger second flow passage 406. Each heat exchanger first flow passage 404 includes an inlet port 408, and inlet header 403, and outlet header 405, and an outlet port 412. Each inlet port 408 is coupled to receive the relatively hot air 202 from within the engine case 116, and each heat exchanger second flow passage 406 is coupled to receive fan air from the bypass flow passage 122. The relatively hot air 202 that flows into the heat exchanger inlet ports 408 flows into and through the associated tubes 402 where it is cooled, and the cooled air 206 is discharged from the associated outlet port 412. Although the tubes shown in FIG. 4 are shown relatively straight, in other embodiments, the tubes may be configured as curved tubes in either the tangential or radial directions, or may be curved in both the tangential and radial directions to provide optimal compliance for thermo-mechanical fatigue strength. Each heat exchanger second flow passage 406 is configured to direct the supplied fan air 203 across the associated tubes 402. The heat exchangers 204 can each be configured such that the fan air flow may be either cross flow, counter flow, or a combination of both.

Figure 6:
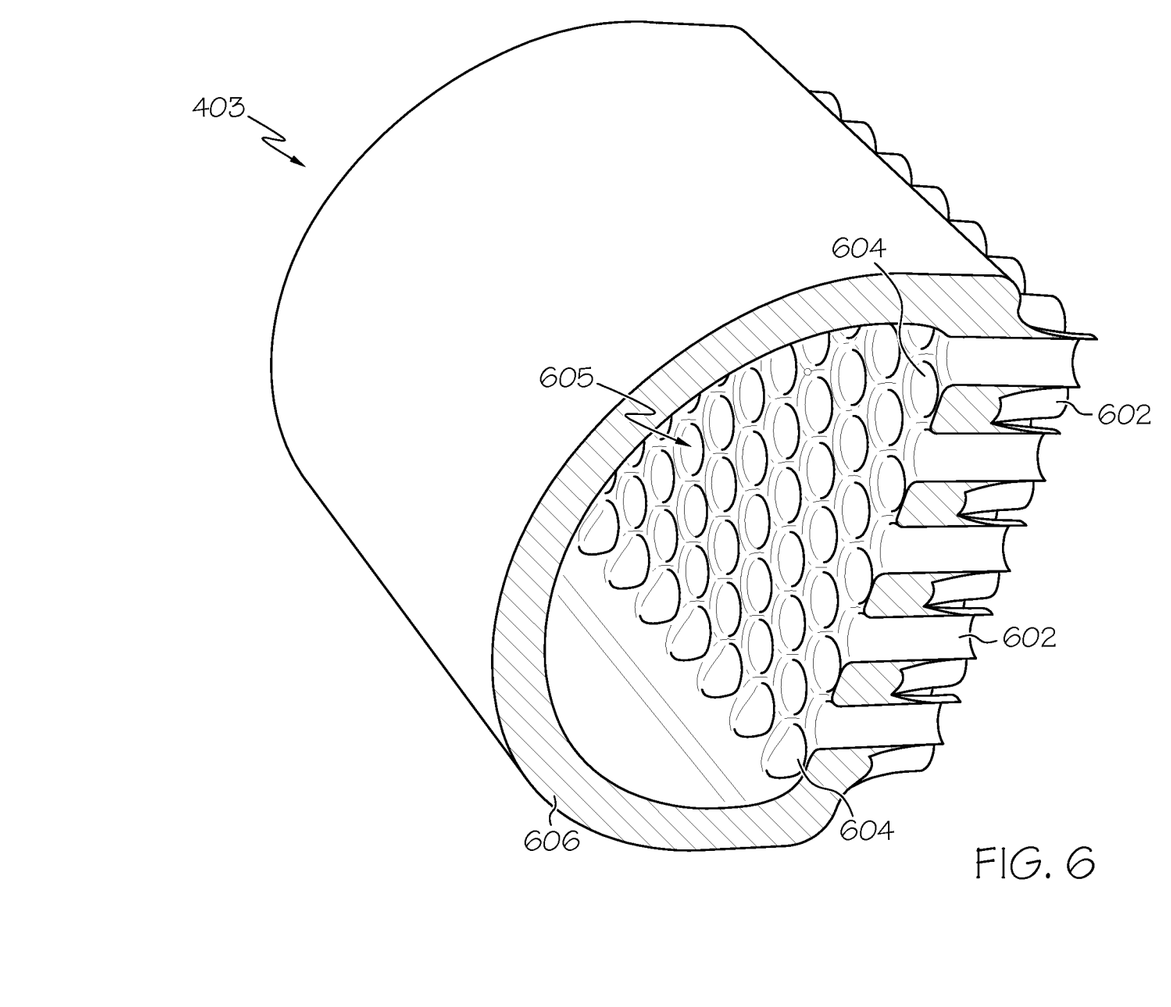
FIGS. 6 and 7 depict an exemplary inlet header of a heat exchange system in accordance with the present disclosure.
Figure 7:
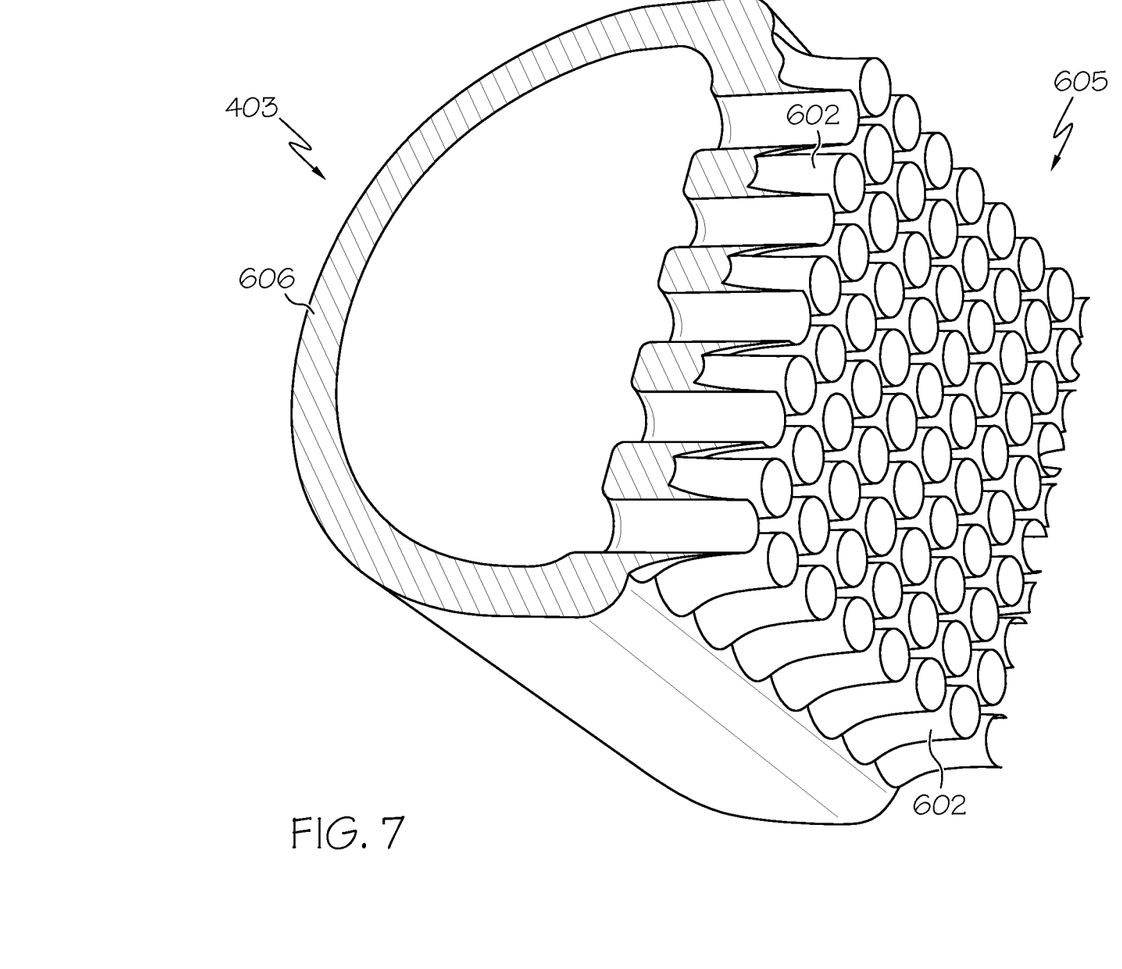

FIGS. 6 and 7 provide expanded views of the inlet header 403 portion (or, alternatively, the outlet header 405 portion) of the presently disclosed heat exchanger 204, implemented as a cooling air heat exchanger. As shown therein, header 403 includes a portion of the first flow passage 404 defined by an outer wall 606 and interface portion 605. The interface portion 605 includes a plurality of header-tube transition portions 602. The header-tube transition portions 602 provide a connection between the header 403 and the plurality of tubes 402 for air to flow from the inlet header 403 and into the tubes 402 for heat exchange with air in the flow passage 406. Each header-tube transition portion 602 includes an inlet portion 604.

Figure 8:
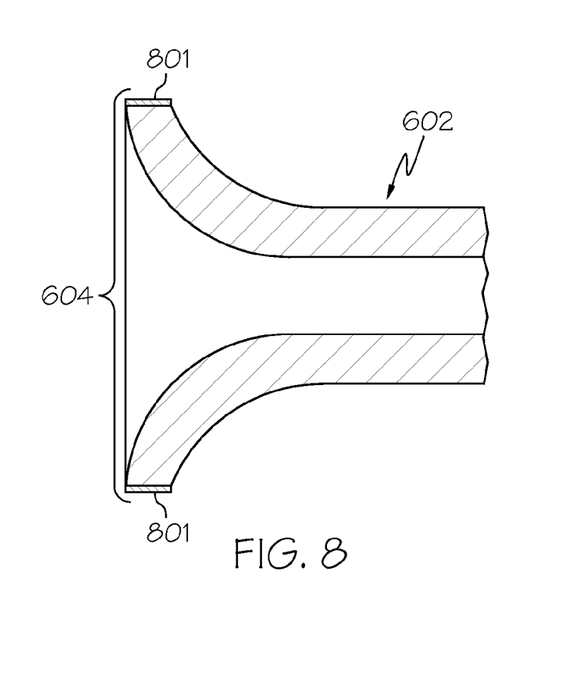
FIGS. 8 and 9 depict cross section views of an exemplary header-tube inlet portion in accordance with the present disclosure.

FIG. 8 provides an expanded, cross-sectional view of the inlet portion 604 of an exemplary header-tube transition portion 602. As shown therein, the inlet portion 604 is smoothly curved or contoured. This curvature or contour reduces inlet flow losses as compared to traditional sharp cornered tube inlets. In some examples, this flow loss can be reduced by as much as 90% by employing curved or contoured inlet portions 604. The inlet portions 604 are also counter-sunk with respect to the flow passage 604. This counter-sunk design allows for a smooth transition of cooling air from the header 403 into the tubes 402 to minimize pressure drops. Each transition portion 602 can be brazed around the perimeter of the inlet portion 604, as shown by brazing area 801, for connection with other transition portions 602 to form the interface portion 605, as shown in FIGS. 6 and 7.

Figure 9:
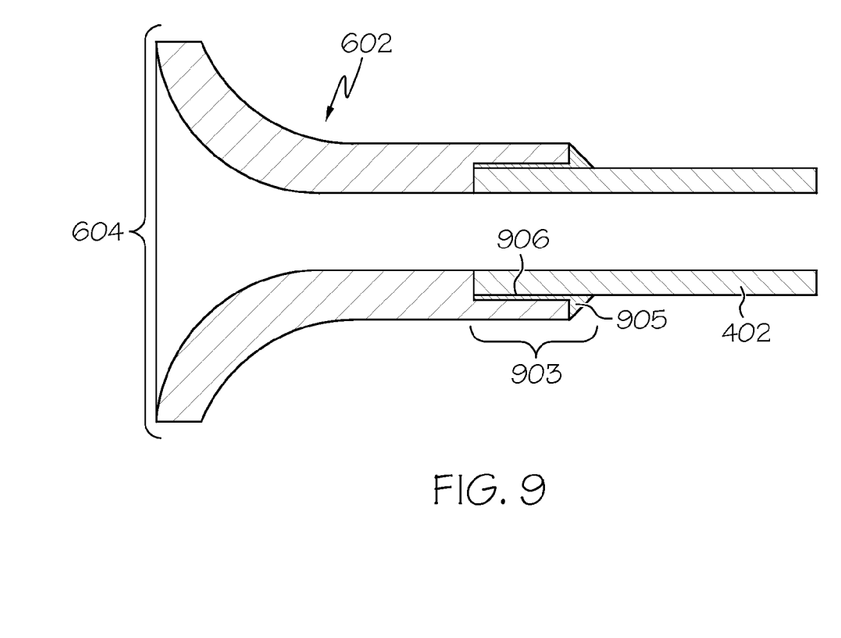

FIG. 9 provides an expanded, cross-sectional view of the header-tube transition portion 602 that has been connected to a tube 402. The header-tube transition portion 602 includes a tapered tube connection portion 903, which facilitates a fluid connection with the tubes 402. This tapered tube connection portion 903 minimizes the stresses across the interface portion 605. For example, the header tapers gradually over the tube to provide a region of structural compliance for attenuating the stresses at the area of connection 906 between the tube 402 and the transition portion 602. The tube 402 and the transition portion 602 can be connected using a braze area 905 and 906. This extended braze area 905 and 906, made possible by the tapered tube connection portion 903, increases the strength of the resulting heat exchanger 204. Furthermore, unlike the prior art, the interface portion 605 may include varying wall thickness features to allow structural compliance in the walls of the header-tube transition portions 602 as well as structural compliance at the connection portion 903.

In some embodiments, the tubes 402 are fabricated with internal heat transfer augmentation features such as spiral grooves or turbulators, dimples, spherical bumps, and other internal augmentor devices as are known to those having ordinary skill in the art. In addition, the external surfaces of the tubes 402 may be enhanced with oval or airfoil shapes to reduce pressure losses in the tube bundle while simultaneously enhancing external surface area. External heat transfer augmentation features may be employed such as dimples or rougheners to speed transition to turbulent flow and to augment heat transfer in the tube bundle.

Figure 10:
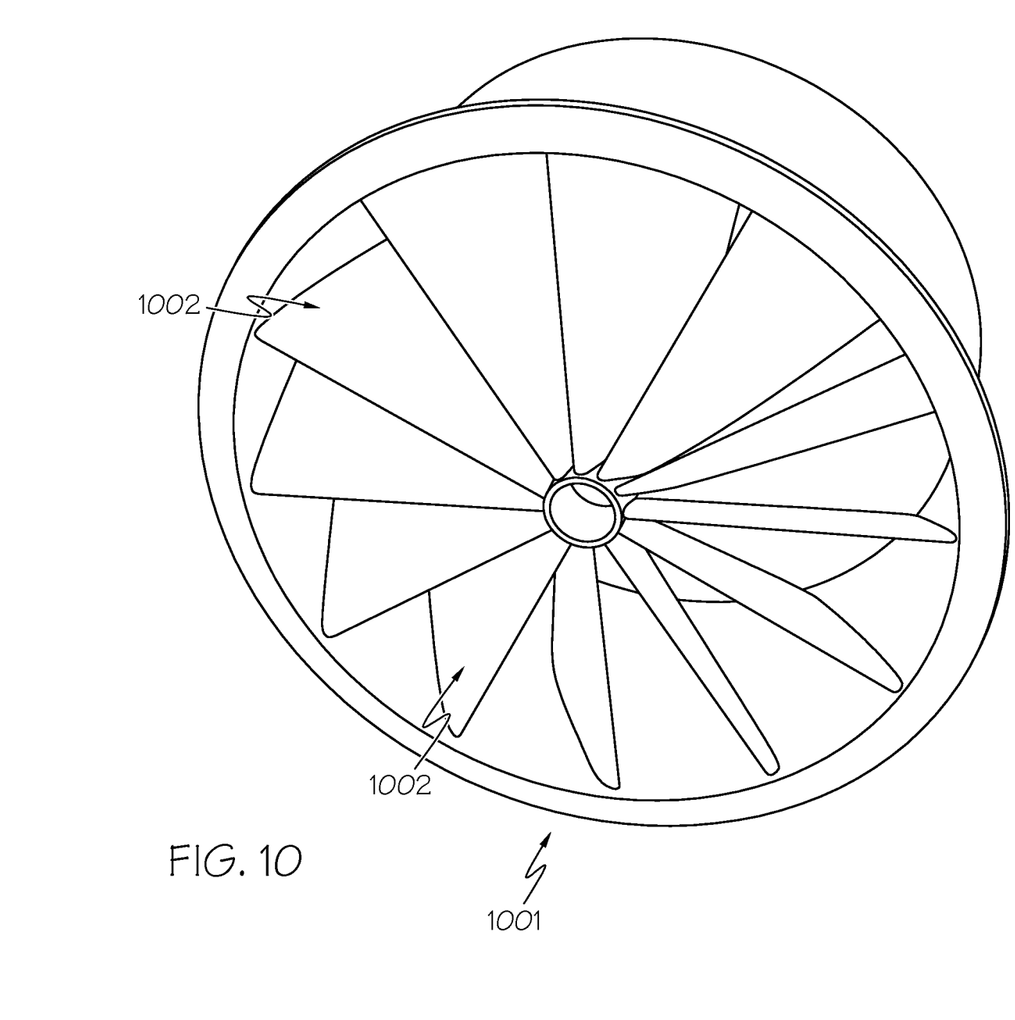
FIG. 10 depicts a pre-swirler for use with embodiments of the present disclosure.

In some embodiments, the inlet portions 604 may include tube entrance pre-swirlers 1001, as shown in FIG. 10. Tube entrance pre-swirlers 1001 may be provided to augment heat transfer in the tubes to provide improved thermal effectiveness, i.e. heat transfer. The swirlers 1001, as shown in FIG. 10, are generally circular in shape, and include one or more vanes 1002 that are angled to enable the pre-swirler 1001 to induce swirl in the incoming air when the air flows over the vanes 1002. Spinning of the incoming air as it flows through the pre-swirler 1001 causes the air to enter the tubes 402 with a radial and angular velocity, in addition to the axial velocity, thereby improving air mixing and consequent heat transfer within the tubes 402.

Figure 11:
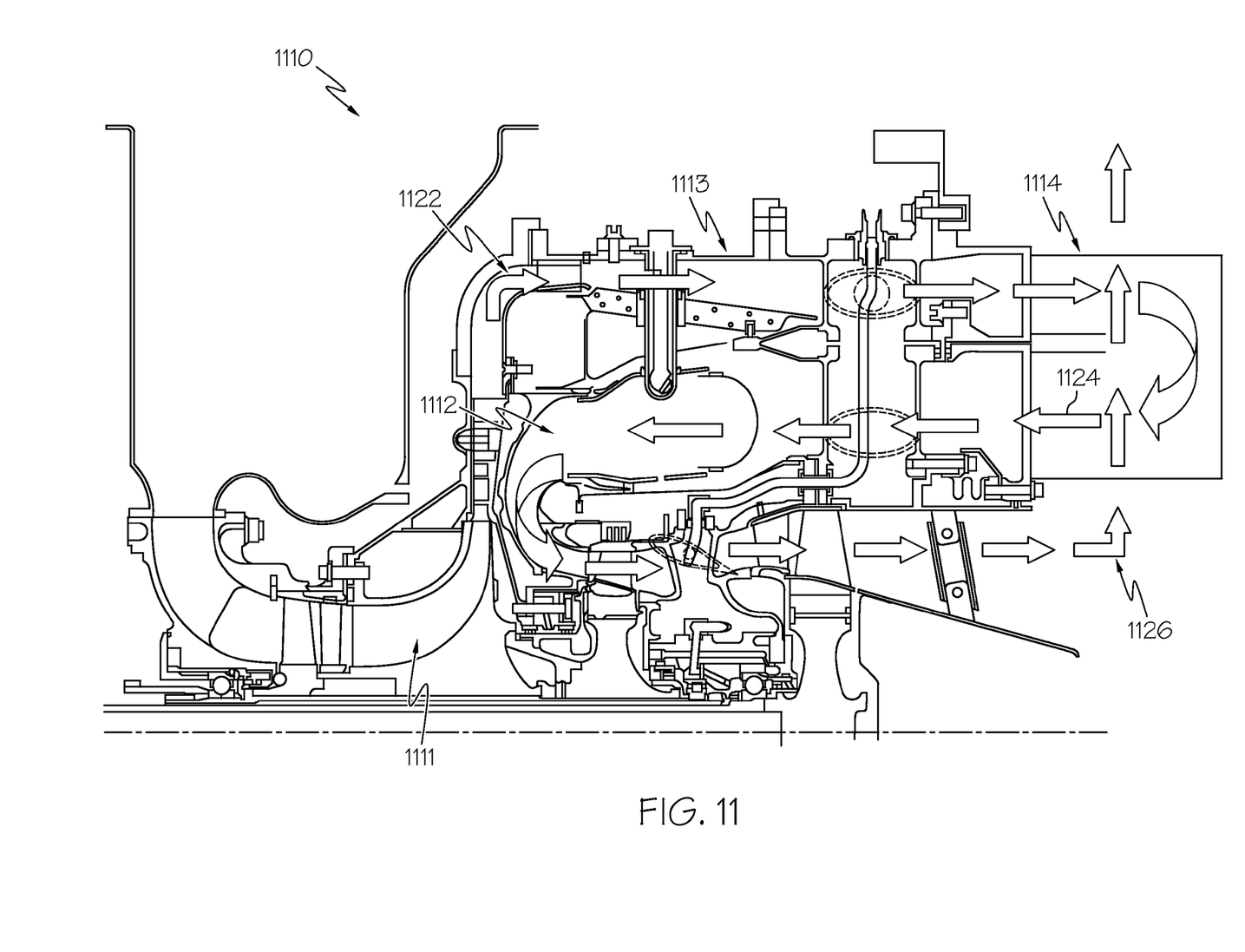
FIG. 11 depicts a simplified cross section view of a portion of another exemplary gas turbine engine.

As discussed at the outset of this disclosure, the heat exchangers in accordance with the present invention can be embodied in a variety of forms for use in gas turbine engines and in other applications. The previously described cooling air heat exchanger is merely one embodiment. In another embodiment, the heat exchange systems of the present invention can be implemented as recuperators for heating compressed air prior to the entry thereof in the combustor. Referring now particularly to FIG. 11, a simplified cross section view of a portion of another exemplary gas turbine engine 1110 is depicted. In this exemplary engine design, cold air flows from compressor 1111 along a first flow path 1122 and into recuperator 1114. As it flows through the recuperator, the cold compressed air may be heated by the flow of hot exhaust gas from combustor 1112, positioned within combustor case 1113, by way of exhaust gas flow path 1126. The heated compressed air can then flow along the second flow path 1124 and into combustor 1112. The heated compressed air may then be used in the combustion process in combustor 1112 to produce exhaust gas which can be cycled through recuperator 1114 along exhaust flow path 1126. (The gas turbine engine with recuperator configuration shown by way of example in FIG. 11 is described in greater detail in commonly-assigned U.S. Pat. No. 7,124,572, titled "Recuperator and turbine support adapter for recuperated gas turbine engines," issued Oct. 24, 2006, the contents of which are incorporated by reference herein in their entirety.)

The heat exchange system, embodied as recuperator 1114, beneficially includes the same heat exchange enhancing features and connection stress reducing features as described above with regard to cooling air heat exchanger 204. These features may include one or more of structurally compliant, counter-sunk inlets, varying wall thickness features, curved or contoured inlets, structurally compliant, tapered connection portions, extended braze areas, pre-swirlers, and external or internal heat transfer augmentation features. However, the recuperator 1114 may be sized and shaped to accommodate its functionality as a recuperator. Generally speaking, the length of tubes may be modified, the number of tubes may be modified, the diameter and wall thickness of the tubes may be modified, the shape of the overall apparatus may be modified (i.e., rectangular, circular, etc. as compared to curved according to the shape of the nacelle), and the flow configuration may be modified, among other things.

In general, it is expected that, based on the teachings herein, a person having ordinary skill in the art will be able to modify the heat exchange system as above to conform for use in a wide variety of applications, as the selection of size, shape, etc. of working components is generally considered to be within the level of skill of a person having ordinary skill in the art. As such, the various possible implementations of the heat exchange systems should not be considered limited to any of the embodiments presented herein.

It will be appreciated that certain features of the presently described heat exchange systems would be prohibitively expensive to manufacture using conventional manufacturing techniques. These include the contoured or curved inlets, the varying wall thickness features, and the structurally compliant connection portions, among others. As such, designs in accordance with the present disclosure are not known in the prior art. However, it has been discovered that using additive manufacturing techniques, or other recently developed manufacturing techniques, designs in accordance with the present disclosure can be manufactured at a significantly reduced cost as compared to traditional manufacturing techniques. Additive manufacturing techniques include, for example, direct metal laser sintering (DMLS—a form of direct metal laser fusion (DMLF)) with nickel base super-alloys, low density titanium, and aluminum alloys. DMLS is discussed in greater detail below. Another technique includes electron beam melting (EBM) with titanium, titanium aluminide, and nickel base super-alloy materials. Still further, casting or metal injection molding (MIM) may be employed.

Figure 12:
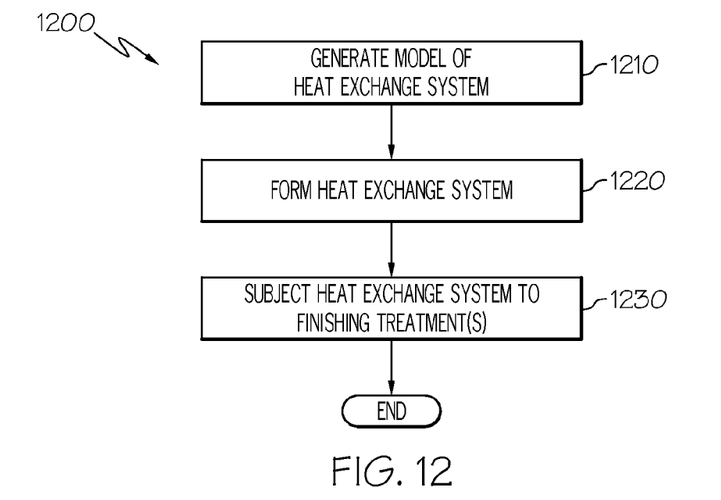
FIG. 12 is a flow diagram illustrating steps in a method of manufacturing a heat exchange system in accordance with embodiments of the present disclosure.

FIG. 12 is a flowchart illustrating a method 1200 for manufacturing a heat exchange system, such as the cooling air heat exchanger 204 as shown in FIG. 2 or the recuperator 1114 as shown in FIG. 11, in accordance with an exemplary embodiment using, in whole or in part, additive manufacturing techniques. In the discussion that follows, "the heat exchange system" will be referred to generically as representative of any or all portions of a heat exchange system in accordance with the present disclosure, including but not limited to the tubes 403, the header-tube transition portions 602, etc., that can be made using additive manufacturing techniques. Of course, as discussed above, various components of the heat exchange system, whether made by additive manufacturing techniques or otherwise, may be brazed or otherwise joined together to form a completed heat exchange system, such as the cooling air heat exchanger 204 as shown in FIG. 2 or the recuperator 1114 as shown in FIG. 11.

In a first step 1210, a model, such as a design model, of the heat exchange system may be defined in any suitable manner. For example, the model may be designed with computer aided design (CAD) software and may include three-dimensional ("3D") numeric coordinates of the entire configuration of the heat exchange system including both external and internal surfaces. In one exemplary embodiment, the model may include a number of successive two-dimensional ("2D") cross-sectional slices that together form the 3D component.

In step 1220 of the method 1200, the heat exchange system is formed according to the model of step 1210. In one exemplary embodiment, a portion of the heat exchange system is formed using a rapid prototyping or additive layer manufacturing process. In other embodiments, the entire heat exchange system is formed using a rapid prototyping or additive layer manufacturing process. In this embodiment, the tubes transition directly from the low loss compliant header-tube transition portions 602 without the need for brazing. Although additive layer manufacturing processes are described in greater detail below, in still other alternative embodiments, portions of the heat exchange system may be forged or cast in step 1220, for example, with a single-crystal structure.

Some examples of additive layer manufacturing processes include: micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. In one particular exemplary embodiment, direct metal laser fusion (DMLF) is used to produce the heat exchange system in step 1220. DMLF is a commercially available laser-based rapid prototyping and tooling process by which complex parts may be directly produced by precision melting and solidification of metal powder into successive layers of larger structures, each layer corresponding to a cross-sectional layer of the 3D component. DMLF may include direct metal laser sintering (DMLS), as previously noted above.

As such, in one exemplary embodiment, step 1220 is performed with DMLF techniques to form the heat exchange system. However, prior to a discussion of the subsequent method steps, reference is made to FIG. 13, which is a schematic view of a DMLF system 1300 for manufacturing the heat exchange system, for example cooling air heat exchanger 204 as shown in FIG. 2 or the recuperator 1114 as shown in FIG. 11, in accordance with an exemplary embodiment.

Figure 13:
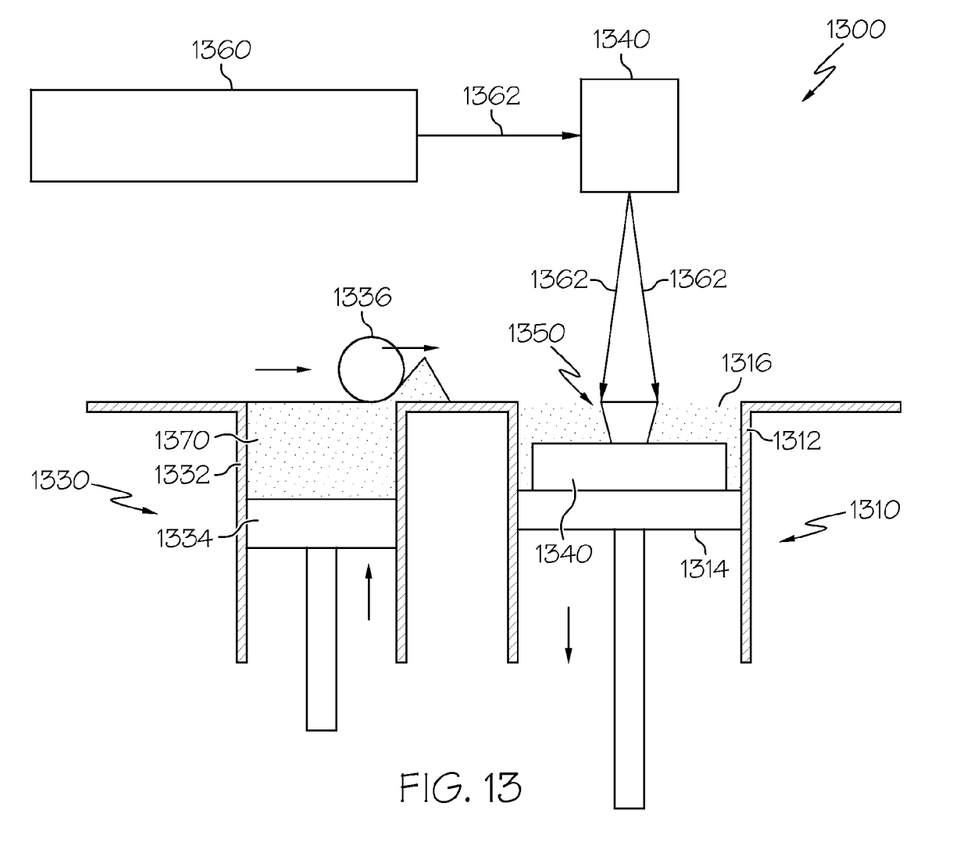
FIG. 13 is an exemplary additive manufacturing system suitable for use in manufacturing heat exchange systems in accordance with the present disclosure.

Referring to FIG. 13, the system 1300 includes a fabrication device 1310, a powder delivery device 1330, a scanner 1340, and a laser 1360 that function to manufacture the article 1350 (e.g., the heat exchange system, or a component thereof) with build material 1370. The fabrication device 1310 includes a build container 1312 with a fabrication support 1314 on which the article 1350 is formed and supported. The fabrication support 1314 is movable within the build container 1312 in a vertical direction and is adjusted in such a way to define a working plane 1316. The delivery device 1330 includes a powder chamber 1332 with a delivery support 1334 that supports the build material 1370 and is also movable in the vertical direction. The delivery device 1330 further includes a roller or wiper 1336 that transfers build material 1370 from the delivery device 1330 to the fabrication device 1310.

During operation, a base block 1340 may be installed on the fabrication support 1314. The fabrication support 1314 is lowered and the delivery support 1334 is raised. The roller or wiper 1336 scrapes or otherwise pushes a portion of the build material 1370 from the delivery device 1330 to form the working plane 1316 in the fabrication device 1310. The laser 1360 emits a laser beam 1362, which is directed by the scanner 1340 onto the build material 1370 in the working plane 1316 to selectively fuse the build material 1370 into a cross-sectional layer of the article 1350 according to the design. More specifically, the speed, position, and other operating parameters of the laser beam 1362 are controlled to selectively fuse the powder of the build material 1370 into larger structures by rapidly melting the powder particles that may melt or diffuse into the solid structure below, and subsequently, cool and re-solidify. As such, based on the control of the laser beam 1362, each layer of build material 1370 may include unfused and fused build material 1370 that respectively corresponds to the cross-sectional passages and walls that form the article 1350. In general, the laser beam 1362 is relatively low power to selectively fuse the individual layer of build material 1370. As an example, the laser beam 1362 may have a power of approximately 50 to 500 Watts, although any suitable power may be provided.

Upon completion of a respective layer, the fabrication support 1314 is lowered and the delivery support 1334 is raised. Typically, the fabrication support 1314, and thus the article 1350, does not move in a horizontal plane during this step. The roller or wiper 1336 again pushes a portion of the build material 1370 from the delivery device 1330 to form an additional layer of build material 1370 on the working plane 1316 of the fabrication device 1310. The laser beam 1362 is movably supported relative to the article 1350 and is again controlled to selectively form another cross-sectional layer. As such, the article 1350 is positioned in a bed of build material 1370 as the successive layers are formed such that the unfused and fused material supports subsequent layers. This process is continued according to the modeled design as successive cross-sectional layers are formed into the completed desired portion, e.g., the heat exchange system of step 1220.

The delivery of build material 1370 and movement of the article 1350 in the vertical direction are relatively constant and only the movement of the laser beam 1362 is selectively controlled to provide a simpler and more precise implementation. The localized fusing of the build material 1370 enables more precise placement of fused material to reduce or eliminate the occurrence of over-deposition of material and excessive energy or heat, which may otherwise result in cracking or distortion. The unused and unfused build material 1370 may be reused, thereby further reducing scrap.

Any suitable laser and laser parameters may be used, including considerations with respect to power, laser beam spot size, and scanning velocity. As a general matter, the build material 1370 may be formed by any suitable powder, including powdered metals, such as a stainless steel powder, and alloys and super alloy materials, such as nickel-based or cobalt superalloys. In one exemplary embodiment, the build material 1370 is a high temperature nickel base super alloy such as IN718. In other embodiments, MAR-M-247, IN738, titanium, aluminum, titanium-aluminide, or other suitable alloys may be employed. In general, the powder build material 1370 may be selected for enhanced strength, durability, and useful life, particularly at high temperatures, although as described below, the powder build material 1370 may also be selected based on the intended function of the area being formed.

Returning to FIG. 12, at the completion of step 1220, the article 1350, i.e., the heat exchange system, is removed from the additive manufacturing system (e.g., from the DMLF system 1300). In optional step 1230, the heat exchange system formed in step 1220 may undergo finishing treatments. Finishing treatments may include, for example, aging, annealing, quenching, peening, polishing, hot isostatic pressing (HIP), or coatings. One example of a post-laser fusion process of step 1230 is a HIP process in which an encapsulation layer is applied to the intermediate turbine component article and pressure and heat are applied to remove or reduce any porosity and cracks internal to or on the surface of the component, as described in U.S. patent application Ser. No. 12/820,652, titled "METHODS FOR MANUFACTURING TURBINE COMPONENTS," filed Jun. 22, 2010, and published as United States Patent Application Publication No. 2011/0311389, published Dec. 22, 2011, the contents of which are herein incorporated by reference in their entirety. The encapsulation layer functions to effectively convert any surface porosity and cracks into internal porosity and cracks, and after the application of pressure and heat, removes or reduces the porosity and cracks. Such encapsulation layers may be subsequently removed or maintained to function as an oxidation protection layer.

In one exemplary embodiment, the encapsulation layer may be a metal or alloy that is compatible with the substrate and may be applied by a plating or coating process, as described below. In one embodiment, the HIP process may be performed at a processing temperature in a range of about 1000° C. to about 1300° C. and may be performed at a pressure in a range of about 1 ksi to about 25 ksi for a time period of about 1 to about 10 hours. In other embodiments, the HIP processing temperature, pressure, and time may be smaller or larger to form a compacted solid having negligible porosity.

If necessary, the heat exchange system may be machined to final specifications. The machining techniques may include, for example, brazing as noted above to connect the tubes 402 with the header-tube transition portions 602. At this point, "the heat exchange system" as referred to herein regarding additive manufacturing techniques corresponds with the finished heat exchange system shown in FIGS. 2 and 11. In further steps (not shown), the heat exchange system may be tested and installed in a gas turbine engine, as shown in FIGS. 2 and 11.

The method 1200 has been discussed above with reference to the formation of a single heat exchange system. However, in one exemplary embodiment of the method 1200, more than one heat exchange system may be manufactured simultaneously. Unless otherwise noted, method 1200 in this embodiment proceeds as discussed above. In this embodiment of the method 1200, the articles are formed on a common base block (e.g., base block 1340) to provide a common orientation and a known point of reference and formed as discussed above. Successive layers can be formed for the group of articles simultaneously according to a common module or design. For example, the powdered metal may be deposited across a single working plane and one or more lasers may selectively fuse the layers of each intermediate turbine article, either sequentially or simultaneously. The articles may then be lowered together for the formation of the next layer. Simultaneous fabrication of a number of components may reduce cost and variability of the manufacturing process.

Accordingly, exemplary embodiments may enhance heat exchange systems fabricated with additive manufacturing techniques, including DMLF/DMLS. In particular, durability and life span of the heat exchange system may be improved by manufacturing each portion of the heat exchange system using designs that minimize the structural stresses that will be encountered during operation, and by improving the physical connection between the various components, for example, the connection portion between the tubes 402 and the inlet or outlet headers 403, 405. Additionally, rapid prototyping and manufacturing reduces cracks and other issues and reduces costs and cycle time in the system design, particularly in the iterative environment of gas turbine engine component design.

While at least one exemplary embodiment has been presented in the foregoing detailed description, it should be appreciated that a vast number of variations exist. It should also be appreciated that the exemplary embodiments of the heat exchange system are only examples, and are not intended to limit the scope, applicability, or configuration of the invention in any way. Rather, the foregoing detailed description will provide those skilled in the art with a convenient road map for implementing an exemplary embodiment of the inventive heat exchange system. It is understood that various changes may be made in the function and arrangement of elements described in an exemplary embodiment without departing from the scope of the invention as set forth in the appended claims.

What is claimed is:

1. A heat exchange system, comprising:
a first flow passage and a second flow passage, the heat exchange system being configured to transfer heat between a first fluid flowing through the first flow passage and a second fluid flowing through the second flow passage;
wherein the first flow passage comprises an inlet header, a plurality of tubes, and an outlet header, wherein the first fluid flows through the tube in a first direction and wherein the second fluid flows across the tubes in a second flow direction the is perpendicular to the first flow direction, wherein the inlet header and the outlet header each have an arcuate cross-section in a first plane that extends perpendicular to the first flow direction and parallel to the second flow direction, wherein each tube of the plurality of tubes extends linearly between the inlet header and the outlet header and perpendicularly with respect to the first plane, and wherein the plurality of tubes are disposed along an entirety of the arcuate cross-section of the inlet header and the outlet header; and
wherein the inlet header comprises a plurality of header-tube transition portions configured to allow the first fluid to flow from the inlet header and into the tubes, the plurality of header-tube transition portions each comprising a smoothly curved inlet portion and a tapered tube connection portion, wherein the tapered tube connection portion is defined by a first end adjacent to the smoothly curved inlet portion and a second end adjacent to a tube of the plurality of tubes, wherein the first end and second end outer walls define a constant outer diameter, wherein the first end has an inner wall inner diameter that is less than an inner wall inner diameter of the second end such that a radial wall thickness of the first end is greater than a radial wall thickness of the second end, wherein a transition portion between the first end and the second end is defined by an inner annular wall that extends perpendicularly with respect to the inner walls of the first and second ends, wherein the inner annular wall has a radial length that is equal to the difference between the inner wall inner diameters of the first and second ends, wherein a lateral end of the tube is disposed abuttingly against the inner annular wall, an outer wall of the tube is brazed to the inner wall of the second end, and an inner wall of the tube forms a constant inner diameter with the inner wall of the first end.

2. The heat exchange system of claim 1, wherein the outlet header comprises a plurality of header-tube transition portions configured to allow the first fluid to flow from the tubes and into the outlet header.

3. The heat exchange system of claim 1, wherein each smoothly curved inlet portion is counter-sunk with regard to the first flow passage through the inlet header.

4. The heat exchange system of claim 1, wherein each header-tube transition portion of the plurality of header-tube transition portions includes a varying wall thickness.

5. The heat exchange system of claim 1, wherein each tube of the plurality of tubes is connected to a respective one of the plurality of header-tube transition portions using brazing.

6. The heat exchange system of claim 5, wherein the brazing is provided at the tapered tube connection portion.

7. The heat exchange system of claim 1, further comprising a plurality of pre-swirlers, wherein each of the pre-swirlers comprise a plurality of stationary fan blades or vanes that are angled with respect to the fluid flow in the header-tube transition portion to cause such fluid flow to have a rotational velocity upon passing over such fan blades or vanes, wherein a respective one of the plurality of pre-swirlers is connected to the inlet portion of each header-tube transition portion of the plurality of header-tube transition portions.

8. The heat exchange system of claim 1, wherein the heat exchange system is a cooling air heat exchanger for use in a gas turbine engine.

9. The heat exchange system of claim 1, wherein the heat exchange system is a recuperator for use in a gas turbine engine.

10. The heat exchange system of claim 1, wherein at least part of the heat exchange system is manufactured using additive manufacturing techniques.

11. The heat exchange system of claim 10, wherein at least the plurality of header-tube transition portions comprise one or more of an IN718, titanium alloy, aluminum alloy, nickel base super-alloy, or a titanium-aluminide alloy.

12. The heat exchange system of claim 10, wherein the tubes comprise an internal or external heat transfer augmentation feature.

13. A heat exchange system, comprising:
a heat exchanger disposed within an inner fan duct of a gas turbine engine and comprising a heat exchanger first flow passage and a heat exchanger second flow passage, the heat exchanger first flow passage coupled to receive engine air from within an engine case of the gas turbine engine, the heat exchanger second flow passage coupled to receive fan air from a bypass flow passage of the gas turbine engine, the heat exchanger configured to transfer heat between the engine air and the fan air;
wherein the heat exchanger first flow passage comprises an inlet header, a plurality of tubes, and an outlet header, wherein the first fluid flows through the tube in a first direction and wherein the second fluid flows across the tubes in a second flow direction the is perpendicular to the first flow direction, wherein the inlet header and the outlet header each have an arcuate cross-section in a first plane that extends perpendicular to the first flow direction and parallel to the second flow direction, wherein each tube of the plurality of tubes extends linearly between the inlet header and the outlet header and perpendicularly with respect to the first plane, and wherein the plurality of tubes are disposed along an entirety of the arcuate cross-section of the inlet header and the outlet header; and wherein the inlet header comprises a plurality of header-tube transition portions configured to allow the first fluid to flow from the inlet header and into the tubes, the plurality of header-tube transition portions each comprising a smoothly curved inlet portion and a tapered tube connection portion, wherein the tapered tube connection portion is defined by a first end adjacent to the smoothly curved inlet portion and a second end adjacent to a tube of the plurality of tubes, wherein the first end and second end outer walls define a constant outer diameter, wherein the first end has an inner wall inner diameter that is less than an inner wall inner diameter of the second end such that a radial wall thickness of the first end is greater than a radial wall thickness of the second end, wherein a transition portion between the first end and the second end is defined by an annular wall that extends perpendicularly with respect to the inner walls of the first and second ends, wherein the annular wall has a radial length that is equal to the difference between the inner wall inner diameters of the first and second ends, wherein a lateral end of the tube is disposed abuttingly against the annular wall, an outer wall of the tube is brazed to the inner wall of the second end, and an inner wall of the tube forms a constant inner diameter with the inner wall of the first end.

14. The heat exchange system of claim 13, wherein each smoothly curved inlet portion is counter-sunk with regard to the first flow passage through the inlet header and wherein each header-tube transition portion of the plurality of header-tube transition portions includes a varying wall thickness.

15. The heat exchange system of claim 13, wherein the heat exchange system is manufactured using additive manufacturing techniques.

16. A heat exchange system, comprising:
a plurality of heat exchangers disposed within a turbofan engine, each heat exchanger including a heat exchanger first flow passage and a heat exchanger second flow passage, each heat exchanger first flow passage coupled to receive engine air from within an engine case of the turbofan engine, each heat exchanger second flow passage coupled to receive fan air from a bypass flow passage of the turbofan engine, each heat exchanger being configured to transfer heat between the engine air and the fan air;
wherein the heat exchanger first flow passage comprises an inlet header, a plurality of tubes, and an outlet header, wherein the first fluid flows through the tube in a first direction and wherein the second fluid flows across the tubes in a second flow direction the is perpendicular to the first flow direction, wherein the inlet header and the outlet header each have an arcuate cross-section in a first plane that extends perpendicular to the first flow direction and parallel to the second flow direction, wherein each tube of the plurality of tubes extends linearly between the inlet header and the outlet header and perpendicularly with respect to the first plane, and wherein the plurality of tubes are disposed along an entirety of the arcuate cross-section of the inlet header and the outlet header; and wherein the inlet header comprises a plurality of header-tube transition portions configured to allow the first fluid to flow from the inlet header and into the tubes, the plurality of header-tube transition portions each comprising a smoothly curved inlet portion and a tapered tube connection portion, wherein the tapered tube connection portion is defined by a first end adjacent to the smoothly curved inlet portion and a second end adjacent to a tube of the plurality of tubes, wherein the first end and second end outer walls define a constant outer diameter, wherein the first end has an inner wall inner diameter that is less than an inner wall inner diameter of the second end such that a radial wall thickness of the first end is greater than a radial wall thickness of the second end, wherein a transition portion between the first end and the second end is defined by an annular wall that extends perpendicularly with respect to the inner walls of the first and second ends, wherein the annular wall has a radial length that is equal to the difference between the inner wall inner diameters of the first and second ends, wherein a lateral end of the tube is disposed abuttingly against the annular wall, an outer wall of the tube is brazed to the inner wall of the second end, and an inner wall of the tube forms a constant inner diameter with the inner wall of the first end.

17. The system of claim 16, wherein:
each heat exchanger of the plurality of heat exchangers is disposed within the inner fan duct and is shaped to conform to at least a portion of the inner fan duct; and
the plurality of heat exchangers are coupled together to form an annular ring.

18. The heat exchange system of claim 1, wherein the plurality of header-tube transition portions are brazed together around the perimeter of the smoothly curved inlet portion to form the inlet header.

19. The heat exchange system of claim 1, wherein the inlet header and the outlet header each have a semi-circular cross-section in a second plane that is parallel to both the first and second flow directions, the plurality of tubes being disposed in an area between end-points of the semi-circular cross-section.

20. The heat exchange system of claim 19, further comprising an extended braze area that is disposed along an outer annular wall of the second end and along the outer wall of the tube adjacent to the outer annular wall, the outer annular wall being configured parallel to the inner annular wall but at a greater radius with respect to the inner annular wall.

* * * * *